(12) United States Patent
Daniel et al.

(10) Patent No.: US 9,009,495 B2
(45) Date of Patent: Apr. 14, 2015

(54) HIGH SPEED CRYPTOGRAPHIC COMBINING SYSTEM, AND METHOD FOR PROGRAMMABLE LOGIC DEVICES

(71) Applicant: Envieta LLC, Columbia, MD (US)

(72) Inventors: Arthur Mark Daniel, Odenton, MD (US); John Petro, Columbia, MD (US); Timothy Mark Millhollon, Ellicott City, MD (US)

(73) Assignee: Envieta, LLC, Ellicott City, MD (US)

( * ) Notice: Subject to any disclaimer, the term of this patent is extended or adjusted under 35 U.S.C. 154(b) by 169 days.

(21) Appl. No.: 13/931,585

(22) Filed: Jun. 28, 2013

(65) Prior Publication Data

US 2015/0006913 A1    Jan. 1, 2015

(51) Int. Cl.
*G06F 11/30* (2006.01)
*G06F 21/60* (2013.01)
*H04L 9/08* (2006.01)
*H04L 9/00* (2006.01)

(52) U.S. Cl.
CPC ............ *G06F 21/602* (2013.01); *H04L 9/0816* (2013.01); *H04L 9/00* (2013.01)

(58) Field of Classification Search
CPC ........ G06F 21/602; H04L 9/00; H04L 9/0816
USPC ........................................................ 713/193
See application file for complete search history.

(56) References Cited

U.S. PATENT DOCUMENTS

| | | | |
|---|---|---|---|
| 4,905,176 A | 2/1990 | Schulz | |
| 5,398,284 A * | 3/1995 | Koopman et al. | 380/28 |
| 5,619,575 A * | 4/1997 | Koopman et al. | 380/28 |
| 5,961,577 A | 10/1999 | Soenen et al. | |
| 5,963,104 A | 10/1999 | Buer | |
| 6,278,783 B1 | 8/2001 | Kocher et al. | |
| 6,304,658 B1 | 10/2001 | Kocher et al. | |
| 6,327,661 B1 | 12/2001 | Kocher et al. | |
| 6,381,699 B2 | 4/2002 | Kocher et al. | |
| 6,510,518 B1 | 1/2003 | Jaffe et al. | |
| 6,539,092 B1 | 3/2003 | Kocher | |
| 6,654,884 B2 | 11/2003 | Jaffe et al. | |
| 7,142,670 B2 | 11/2006 | Chari et al. | |
| 7,200,233 B1 | 4/2007 | Keller et al. | |
| 7,318,145 B1 | 1/2008 | Stribaek et al. | |
| 7,424,500 B2 | 9/2008 | Fukushima et al. | |
| 7,506,165 B2 | 3/2009 | Kocher et al. | |
| 7,587,044 B2 | 9/2009 | Kocher et al. | |
| 7,599,488 B2 | 10/2009 | Kocher et al. | |
| 7,634,083 B2 | 12/2009 | Kocher et al. | |

(Continued)

FOREIGN PATENT DOCUMENTS

| | | |
|---|---|---|
| CA | 2388971 A1 | 5/2001 |
| EP | 2148462 A1 | 1/2010 |

*Primary Examiner* — Krisna Lim
(74) *Attorney, Agent, or Firm* — ATFirm PLLC; Ralph P. Albrecht

(57) ABSTRACT

A system, apparatus, method, and/or computer program product is disclosed for decreasing side channel signal leakage and increasing speed of cryptographic combining operations. An exemplary method may be incorporated, in an exemplary embodiment, in an exemplary programmable logic device (PLD) such as, e.g., but not limited to, a field programmable gate array (FPGA) implementation of at least one cryptographic combining process, or may include an application specific integrated circuit (ASIC) design where cryptographic combining with minimal side channel signal leakage and high speed are provided.

31 Claims, 3 Drawing Sheets

(56) References Cited

U.S. PATENT DOCUMENTS

| | | |
|---|---|---|
| 7,668,310 B2 | 2/2010 | Kocher et al. |
| 7,787,620 B2 | 8/2010 | Kocher et al. |
| 7,792,287 B2 | 9/2010 | Kocher et al. |
| 7,873,881 B2 | 1/2011 | Box et al. |
| 7,941,666 B2 | 5/2011 | Kocher |
| 8,190,665 B2 | 5/2012 | Stribaek et al. |
| 8,195,957 B2 | 6/2012 | Dolgunov et al. |
| 8,250,378 B1 | 8/2012 | Sims |
| 8,625,780 B2 | 1/2014 | Peter et al. |
| 8,879,724 B2 | 11/2014 | Kocher et al. |
| 2006/0056623 A1* | 3/2006 | Gligor et al. .............. 380/28 |
| 2010/0091982 A1 | 4/2010 | Kocher et al. |
| 2011/0116625 A1* | 5/2011 | Michiels et al. .............. 380/28 |
| 2011/0116628 A1* | 5/2011 | Wack et al. .............. 380/44 |
| 2012/0017089 A1 | 1/2012 | Kocher |
| 2012/0045061 A1 | 2/2012 | Danger et al. |
| 2013/0177155 A1* | 7/2013 | Akhavan-Toyserkani et al. .............. 380/255 |

\* cited by examiner

HIGH SPEED CRYPTOGRAPHIC COMBINING SYSTEM, AND METHOD FOR PROGRAMMABLE LOGIC DEVICES

GOVERNMENT LICENSE RIGHTS

This invention was made with government support. The Government has certain rights in the invention. The inventions in this application were made, supported in part by Contract No. N41756-12-C-3017 awarded by the U.S. Department of Navy. The U.S. Government may therefore have a paid-up license in this invention and may have the right to require patent owner to license others on reasonable terms as provided for by the terms of the above-identified contract.

BACKGROUND OF THE INVENTION

1. Field of the Invention

The present invention relates generally to cryptographic systems. More particularly, it relates to systems and methods for realizing efficient combining of binary data at high speed to support various cryptographic processes. In particular this invention can be used for, e.g., but is not limited to, mitigating side channel information leakage that enables recovery of secret data via means such as differential power analysis (DPA).

2. Related Art

To carry out cryptographic computations, whether for encrypting data for confidentiality, signing data for proof of origin certification, or hashing data for authenticity certification, one may use methods for realizing deterministic combining functions that take two or more input values, each of various bit lengths, and produce an output value of some determinate bit length. For security these functions are often very complex. Conventional methods for realizing very complex combining functions as required for cryptographic computations call for building up complexity by splitting input quantities into small packets such as, e.g., but not limited to, 8-bit bytes, 16-bit di-bytes, etc., and then in parallel across the processor real estate, or serially in time combining these packets of the input via and/or/nor gates and registering intermediate results to await further processing in time.

There is a constant tension between first, complexity of the combining function necessary for good security, and second, realizing such complex functions quickly and efficiently as necessary to achieve the functional requirements of an application. Much effort has gone into achieving good cryptographic combining efficiently, but it would be good for additional progress to be made in this regard.

Secret values processed in conventional cryptographic methods are vulnerable to recovery by an adversary by exploiting information leaked via side channels, such as the instantaneous power consumption of a method as the secret value is being processed. One example of side channel leakage is differential power analysis (DPA). DPA involves measurement of a cryptographic system's computer processor's power usage and employment of statistical analysis to convert raw power signals back into the values being processed. Conventional cryptographic methods process secret key data and input information data generally by, e.g., but not limited to, 8-bit bytes (sometimes 16-bit di-bytes, and seldom beyond 32-bit quad-bytes) within a given algorithmic step. By this we mean for instance that if the secret key data is 128 bits (16 bytes) and the input information data is 128 bits, then within a single algorithmic step the two groups of 16-byte quantities may be combined by combining byte 1 of the key and byte 1 of the information, byte 2 of the key and byte 2 of the information, etc. Cryptographic processing methods implement such algorithms by combining these byte pairs across one or more clock cycles of the processor and storing intermediate values in processor registers awaiting another round of combination. The power consumption during these writes to registers are a prime source of information leakage. Conventional solutions have attempted to mask such power usage through various mitigation algorithms. Some conventional solutions remain vulnerable to such attacks.

Conventional security applications generally employ an integrated circuit (IC) on which may be embedded a secret value, or may employ a random number generator to derive one or more secret values. These secret values, whose bit lengths can range in size from roughly 64 to 2048 bits, and more, are used in cryptographic processes to realize security services such as, e.g., but not limited to, proof of identity, authentication, or data encryption. In many applications it is vital that these secret values never be exposed off of the device. Various signals conventionally emanate from the IC-based device as the device carries out cryptographic operations, whereby the signals may leak information about those secret values. In some instances, the signals can provide sufficient information to enable derivation of the core secret value(s), e.g. cryptographic keying material, used in the cryptographic process. Such so-called "side channel" signals can thus sometimes be employed to extract the core secrets from the device compromising the security service afforded by the device. DPA is a well-known, proven and powerful technique for an adversary to extract such device secrets from the device power consumption side channel.

Instantaneous power consumption of a device, referred to as a side-channel, leaks information about the values being processed by the device primarily when such values are written to, or read from, the device's registers. These register reads and writes take place at regular processor clock cycles of the device. Thus whenever the secret values are used in logic operations, and inputs or outputs of these logic operations are written to, or read from, the registers, information about the values being written, or read, is leaked by the device power consumption at that cycle.

An improved system and method for avoiding side channel attacks that overcomes shortcomings of conventional mitigation techniques is highly desirable.

SUMMARY OF VARIOUS EXEMPLARY EMBODIMENTS OF INVENTION

Various exemplary embodiments of a system, and method for providing high speed combining of large bit-length inputs are set forth in detail herein.

According to an exemplary embodiment, an apparatus, system, and method, may minimize side channel leakage. An exemplary system or method discloses an efficient technique for realizing cryptographic combining operations that minimize side channel signal leakage. According to an exemplary embodiment, an exemplary system or method may simultaneously mix an entire key with, e.g., but not limited to, additional deterministic but changing data in a single clock cycle, to create a continually changing effective encryption key so as to avoid providing multiple looks at the effective key conventionally employed for encryption, a shortcoming of conventional solutions.

According to an exemplary embodiment, a system or method may include a cryptographic combining operation, according to an exemplary embodiment, accomplished by use of a modern electronic processor with dedicated computational circuits in hardware such as, e.g., but not limited to, programmable logic devices (PLDs), which according to an exemplary embodiment may include, e.g., but not limited to, field programmable gate arrays (FPGAs), or application specific integrated circuits (ASICs), etc., which may be ideal for realizing any sort of combining function.

An exemplary embodiment of the present invention, may include an exemplary hardware based mitigation technique. According to one exemplary embodiment, an exemplary apparatus, system, or method may be provided that may perform an exemplary method for realizing cryptographic combining operations in a manner that may minimize side channel power information loss. An exemplary embodiment of the claimed method may minimize side channel leakage by performing all of the combining operations of the exemplary method on a large component of, or a substantial portion of, the input value, even all of the input value, according to an exemplary embodiment, and the combined result may be stored to a register, advantageously, within an exemplary single processor clock cycle, according to an exemplary embodiment.

According to an exemplary embodiment of the claimed invention, an apparatus, system and/or method may include, e.g., but not limited to, receiving, by at least one cryptographic combiner device, at least one large bit length input value; and transforming, by the at least one cryptographic combiner device, the at least one large bit length input value into at least one output value, wherein the transforming may include transforming, by the at least one cryptographic combiner device, the at least one large bit length input value into the at least one output value within a single clock cycle.

According to an exemplary embodiment, the method may include where the at least one cryptographic combiner device may include at least a portion of: at least one programmable logic device (PLD).

According to an exemplary embodiment, the method may include where the at least one PLD may include at least one of: at least one field programmable gate array (FPGA); at least one application specific integrated circuit (ASIC); at least one programmable logic array (PLA); at least one programmable read only memory (PROM); at least one erasable programmable read only memory (EPROM); at least one electrically erasable programmable read only memory (EEPROM); at least one programmable array logic (PAL); at least one generic array logic (GAL); at least one programmable electrically erasable logic (PEEL); at least one semiconductor intellectual property core (IP core); or at least one complex programmable logic device (CPLD).

According to an exemplary embodiment, the method may include where the transforming is performed on an entirety of the large bit length input value.

According to an exemplary embodiment, the method may include where the cryptographic combiner device may include: at least one bank of at least one look-up-table (LUT), each the at least one LUT receiving as input a plurality of single bit input values, and providing as output at least one output bit, wherein when the cryptographic combiner device may include a plurality of banks of the at least one LUT, the at least one output bit from a first of the plurality of banks is wired to feed into the input of the at least one LUT of a second of the plurality of banks, and wherein a total number of banks of the at least one LUTs is any number so long as the large bit length input reaches an output of the last bank of the plurality of banks, to produce the at least one output value, within a single clock cycle.

According to an exemplary embodiment, the method may include where the performing may include: performing the transforming on the plurality of banks of the at least one look-up-table (LUT), wherein the at least one LUT may include at least one of: a small LUT; a programmable LUT; or an n-bit input to x-bit output LUT.

According to an exemplary embodiment, the method may include where the at least one LUT may include an n-bit input to x-bit output LUT, and wherein the n-bit input LUT may include an at least six (6)-bit input LUT, and the x-bit output LUT may include an at least one (1)-bit output LUT.

According to an exemplary embodiment, the method may include where the at least one LUT may include an n-bit input to x-bit output LUT, and, wherein the plurality of banks may include a plurality m banks, where m is greater than 1, and wherein each of the m banks may include a plurality Tj LUTs of the at least one LUT for each bank j=1, 2, . . . , m, wherein for each of the plurality m banks of the plurality Tj LUTs accepts a product Tj*n input bits and produces as output a product Tj*x output bits for each bank j=1, 2, . . . , m.

According to an exemplary embodiment, the method may include where each of the m banks is adapted to operate in parallel and with sufficient efficiency may include at least one of: that computing the at least one output value, processing to obtain the at least one output value, or feeding through all the m banks to obtain the at least one output value within the single clock cycle.

According to an exemplary embodiment, the method may include where the at least one LUT may include the n-bit input to x-bit output LUT, wherein 1<=j<m, and wherein at least one output from a given bank j, is coupled to at least one of T(j+1)*n inputs to next bank j+1.

According to an exemplary embodiment, the method may include where the coupling may include programmably wiring the at least one output from the given bank j to feed to the at least one of the T(j+1)*n inputs of the next bank j+1.

According to an exemplary embodiment, the method may include where the at least one LUT may include the n-bit input to x-bit output LUT, and wherein signals propagate through all the m plurality banks within the single clock cycle.

According to an exemplary embodiment, the method may include where the coupling may include at least one interbank coupling.

According to an exemplary embodiment, the method may further include altering the at least one interbank coupling or at least one parameter of the at least one LUT to achieve a plurality of cryptographic functions.

According to an exemplary embodiment, the method may further include at least one of: wherein the altering may include programmably altering the at least one interbank coupling or the at least one parameter of the at least one LUT; wherein the at least one interbank coupling may include at least one changeable coupling; wherein the altering may include dynamically altering the at least one interbank coupling or the at least one parameter of the at least one LUT; wherein the altering may include altering dynamically during use; or wherein the altering may include altering dynamically over time, during use.

According to an exemplary embodiment, the method may include where transforming may include: combining at least one fixed secret value with at least one time varying input value may include transforming the at least one fixed secret value into at least one second time varying secret value.

According to an exemplary embodiment, the method may include where the transforming may include: using the at least one second time varying secret value in at least one subsequent cryptographic processing wherein a secret value is required.

According to an exemplary embodiment, the method may include where the cryptographic combiner device may include: the portion of the at least one PLD, wherein the receiving the large bit length input value and the transforming the large bit length input value into the output value on the PLD may include: performing a full transformation on an entire input within the single PLD clock cycle by using at least one programmable LUT in fabric of the PLD.

According to an exemplary embodiment, the method may include where the input value constitutes at least one fixed secret value and at least one time varying quantity so as to obscure the at least one fixed secret value and minimizing side channel information leakage about the at least one fixed secret.

According to an exemplary embodiment, the method may include where the input value constitutes at least one secret and at least one time varying quantity, wherein when combined obscures the at least one secret, and minimizes side channel information leakage as could be used to detect the at least one secret.

According to an exemplary embodiment, the method may include where the PLD may include at least one of: at least one application specific integrated circuit (ASIC); at least one programmable logic array (PLA); at least one programmable array logic (PAL); at least one programmable read only memory (PROM); at least one erasable programmable read only memory (EPROM); at least one electrically erasable programmable read only memory (EEPROM); at least one generic array logic (GAL); at least one programmable electrically erasable logic (PEEL); at least one semiconductor intellectual property core (IP core); at least one intellectual property core (IP core); at least one photonic processor; or at least one complex programmable logic device (CPLD).

According to an exemplary embodiment, the method may include where the time varying secret value is used as a key for at least one of: an encryption function, or a keyed message authentication code (MAC) function.

According to an exemplary embodiment, the method may include where the time varying secret value may include the key to the advanced encryption standard (AES).

According to an exemplary embodiment, the method may include where the time varying secret value is used as a pseudo-random bit stream for a cryptographic application.

According to an exemplary embodiment, the method may include where the time varying secret value is used as the pseudo-random bit stream for the cryptographic application, to perform an XOR operation over an input data stream as a stream cipher.

According to another exemplary embodiment, an exemplary system may include, e.g., but not limited to, a cryptographic device may include: at least one cryptographic combiner adapted to receive at least one large bit length input value; and wherein the at least one cryptographic combiner is adapted to transform the at least one large bit length input value into at least one output value, and wherein the at least one cryptographic combiner is adapted to transform the at least one large bit length input value into the at least one output value within a single clock cycle.

According to an exemplary embodiment, the exemplary system may include where the cryptographic device further may include: at least one key cryptographic function may include at least one input coupled to at least one output of the at least one cryptographic combiner.

According to an exemplary embodiment, the exemplary system may include where the at least one key cryptographic function may include an advanced encryption standard (AES) key cryptographic function.

According to an exemplary embodiment, the exemplary system may include where the at least one large bit length input value may include at least one output of at least one processor.

According to an exemplary embodiment, the exemplary system may include where the at least one cryptographic combiner may include at least a portion of: at least one programmable logic device (PLD).

According to an exemplary embodiment, the exemplary system may include where the at least one PLD may include at least one of: at least one field programmable gate array (FPGA); at least one application specific integrated circuit (ASIC); at least one programmable logic array (PLA); at least one programmable read only memory (PROM); at least one erasable programmable read only memory (EPROM); at least one electrically erasable programmable read only memory (EEPROM); at least one programmable array logic (PAL); at least one generic array logic (GAL); at least one programmable electrically erasable logic (PEEL); at least one semiconductor intellectual property core (IP core); or at least one complex programmable logic device (CPLD).

BRIEF DESCRIPTION OF THE DRAWINGS

The foregoing and other features and advantages of the invention will be apparent from the following, more particular description of an embodiment of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF EXEMPLARY EMBODIMENTS OF THE INVENTION

Various exemplary embodiments of the invention are discussed in detail below. While specific exemplary embodiments are discussed, it should be understood that this is done for illustration purposes only. Exemplary means example for purposes of this application, and various embodiments need not include all features as described herein. A person skilled in the relevant art will recognize that other components and configurations can be used without parting from the spirit and scope of the invention.

Exemplary Embodiment of an Improved Cryptographic Combiner

According to an exemplary embodiment, an improved hardware based mitigation technique may be provided that seeks to minimize a time window to a single clock cycle during which a massive number of secret data bits may be combined with other input data.

According to an exemplary embodiment of the invention, it is recognized by the applicant that conventional use of granularity of operations (e.g., 8, 16, or 32-bits, etc.) across one or more processor clock cycles and storage of intermediate values in registers may result in information leakage via power consumption as these operations take place.

Conventional register reads and writes incorporate small components of the secret value, such as, e.g. bits, bytes or words of the secret value, this power leakage information may be combined with statistical and cryptographic analysis, and often the entire secret value may be recovered. For side channel attacks to be successful in capturing a secret value, it is critical that the device repeatedly conduct operations with individual components of the sought after secret value in separate and distinct processes and write results of such processing to intermediate holding registers in order to enable the attacker to isolate components of the secret and gather sufficient data for statistical analysis.

Much effort has gone into designing conventional attempts to minimize side channel information leakage. Given the effectiveness of DPA, most conventional work addresses information leaked by the instantaneous power consumption. These conventional mitigation efforts have generally taken one of two different approaches, classified roughly as hardware or software.

The present invention adds to cryptographic combining by providing a very high speed method to realize thorough combining of large bit-length input quantities, according to an exemplary embodiment. In an exemplary embodiment, processing of the entire large bit-length input quantity via a cryptographic combining operation may occur within a single clock cycle, so as to minimize or eliminate conventional exposure of secret information by conventional sub-portion processing.

Overview of Exemplary Envieta Memory Encryptor

Figure 1:
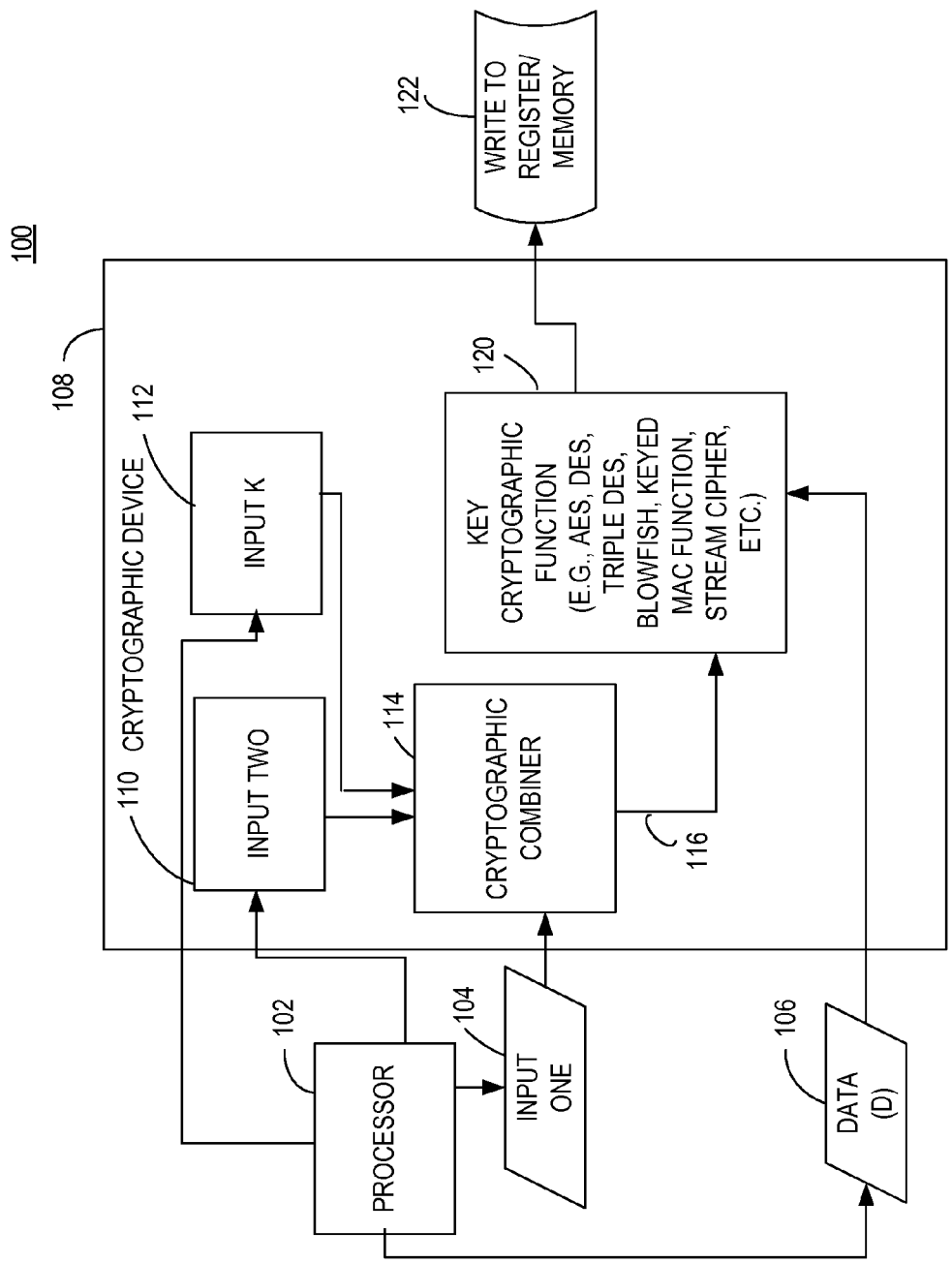
FIG. 1 depicts an exemplary view of an exemplary application of the present invention for exemplary purpose of mitigating side-channel information leakage on an exemplary key cryptographic function using an exemplary cryptographic combiner, according to an exemplary embodiment.

FIG. 1 depicts an exemplary diagram 100 of an exemplary embodiment of an exemplary cryptographic device 108, which may be coupled to a processor 102, and may receive from processor 102, an exemplary input one 104, an exemplary input two 110, and/or any additional inputs K 112, as well as exemplary data (D) 106, according to an exemplary embodiment.

As illustrated, according to an exemplary embodiment, input one 104 may be provided from processor 102 to a cryptographic combiner 114 of the cryptographic device 108.

According to an exemplary embodiment, data D 106 may be provided to a key cryptographic function 120, as illustrated.

According to an exemplary embodiment, exemplary cryptographic device 108 may include, in an exemplary embodiment, input two 110, and/or up to an input k 112 (where k is a finite integer number), which may be coupled to an exemplary cryptographic combiner function 114. According to one exemplary embodiment, cryptographic combiner 114 may receive as inputs, values of input one 104, input two 110, and/or up to input k 112. According to an exemplary embodiment, cryptographic combiner 114 may combine inputs 104, 110, and/or 112, etc., and may provide an intermediate value, or an output 116, to an exemplary key cryptographic function 120, according to an exemplary embodiment.

Exemplary cryptographic combiner 114, according to an exemplary embodiment may receive various inputs, such as, e.g., but not limited to, up to input k 112, input two 110, and/or input one 104, and may combine and/or mix all inputs in one clock cycle to provide output 116 of cryptographic combiner 114 to provide as input in turn to an exemplary key cryptographic function 120, according to an exemplary embodiment. Key cryptographic function 120, may also receive as exemplary input, as illustrated in the exemplary embodiment, data D 106. The key cryptographic function 120 may then encrypt data 106 using an exemplary cryptographic function, such as, e.g., but not limited to, an exemplary advanced encryption standard (AES) encryption key function using, e.g., but not limited to, an exemplary multiple-bit key such as, e.g., but not limited to, an exemplary 256 bit key, etc., according to an exemplary embodiment. Exemplary key cryptographic function 120 may alternatively include any other well known cryptographic function, including, e.g., but not limited to, an exemplary data encryption standard (DES) function, and/or an exemplary Triple DES (3DES) function (which may include, e.g., but not limited to, an exemplary key bundle of three exemplary keys), and/or an exemplary blowfish function (e.g., but not limited to, a keyed symmetric block cipher), and/or an exemplary keyed cryptographic hash function, and/or an exemplary keyed message authentication code (MAC) function, and/or algorithm, and/or an exemplary but not limiting stream cipher, etc., according to an exemplary embodiment. Key cryptographic function 120 may encrypt using an exemplary AES-standard compliant encryption function 120 the received data D 106 and the encrypted data may be written as illustrated to an exemplary register and/or memory 122, according to an exemplary embodiment.

Figure 2:
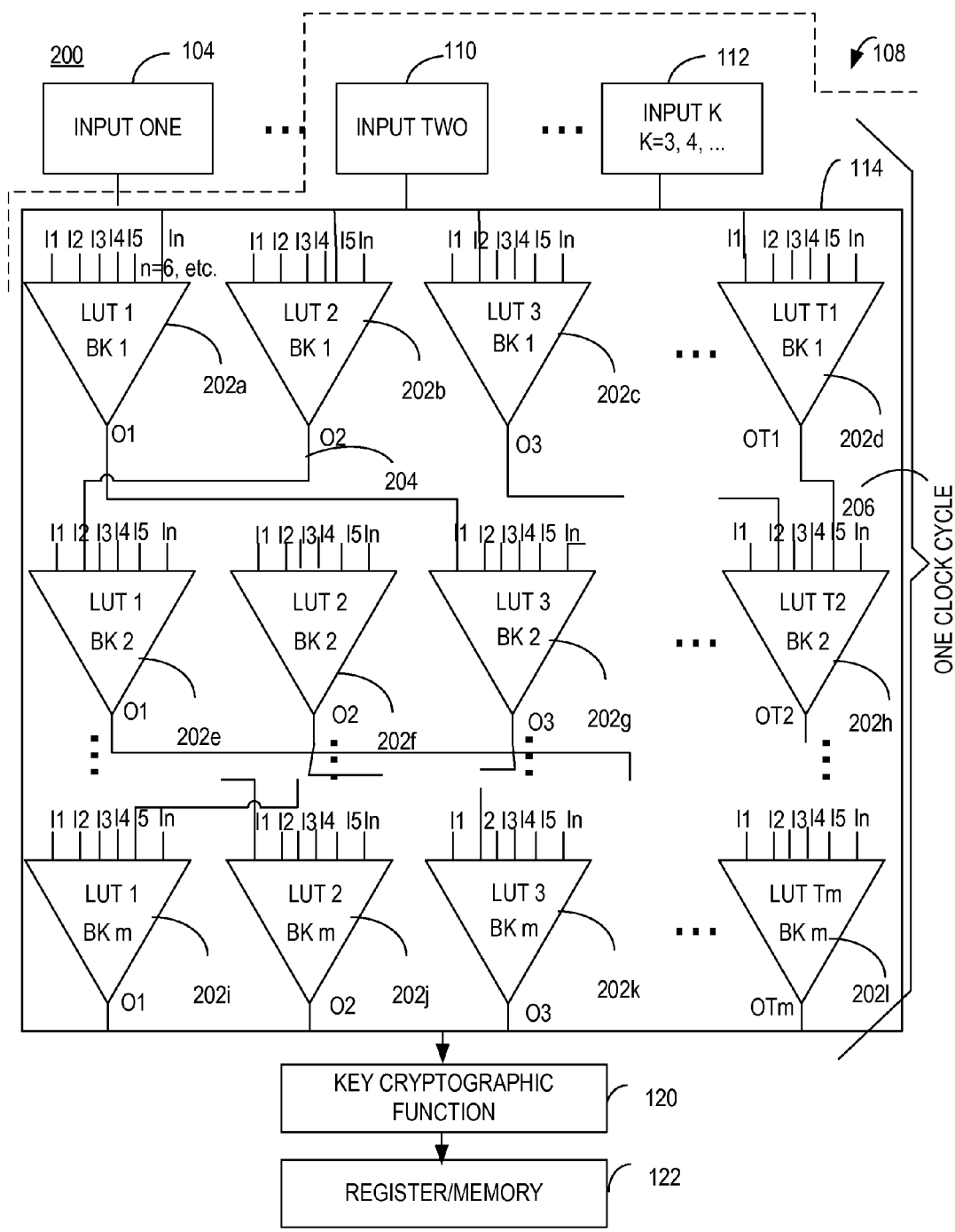
FIG. 2 depicts an exemplary embodiment of an exemplary cryptographic combiner operation or mix function, according to an exemplary embodiment.

FIG. 2 depicts an exemplary diagram 200 of at least a portion of an exemplary cryptographic device 108, which may include an exemplary cryptographic combiner 114. According to an exemplary embodiment, the exemplary cryptographic combiner 114 may combine input one 104, with input two 110 and/or up to input k 112, to produce output 116 (not labeled) to feed into key cryptographic function 120. This cryptographic combiner device 114, may include, as illustrated, in an exemplary embodiment, an exemplary (n*T)-bit input device, wherein n may include, e.g., but may not be limited to, 2, 3, 4, 5, 6, 7, 8, or more, etc., including, e.g., but not limited to, a plurality of look up tables (LUTs) 202a-202l, wherein each LUT may have n inputs, and the device may have m banks of Ti LUTs each, with exemplary T1 LUTs in bank 1, exemplary T2 LUTs in bank 2, and exemplary up to Tm LUTs in bank m, where according to an exemplary embodiment, the sum T1+T2+ . . . +Tm LUTs may be designed or adapted to complete processing of exemplary program logic such as, e.g., but not limited to, combining any combination of inputs 104, 110, and/or up to k 112, and/or other additional program logic such as, e.g., but not limited to, key cryptographic function 120, and may perform the program logic, advantageously, in one clock cycle 206, as illustrated, according to one exemplary embodiment. For example, one bank BK 1, may include LUT 1 202a, LUT 2 202b, LUT 3 202c, and/or any others up until LUT T1 202d, wherein each LUT 202a, 202b, 202c, and 202d, has an exemplary one output O1, O2, O3, and OT1, respectively. Similarly, bank 2 BK2, may include LUT 1 202e, LUT 2 202f, LUT 3 202g, and/or any others up until LUT T2 202h, also having outputs O1-OT2, respectively. Finally, also similarly, bank m BK m, may include LUTs, LUT 1 202i, LUT 2 202j, LUT 3 202k, and/or any others up until LUT Tm 202l, wherein each LUT 202i-202l may have an exemplary output O1-OTm, respectively. In an exemplary embodiment, the total number of LUTs 202a-202l in exemplary bank j may be represented by a number Tj, for j=1, 2, . . . , m. Thus, in one exemplary embodiment, there may be a different number of LUTs per bank, and in another exemplary embodiment, there may be a fixed number of LUTs per bank, according to various exemplary but nonlimiting embodiments. As shown, various interbank wiring as illustrated by interbank wiring 204 may couple any of the LUTs 202a-202l (collectively 202) to one another to perform logical operations in the programmable logic device (PLD). The output of cryptographic combiner 114 may then be provided as input to exemplary key cryptographic function 120 (which may include a register to which the combined value may be written, according to an exemplary embodiment), and/or may be written to a separate register and/or memory 122 as illustrated, according to an exemplary embodiment.

To decrypt from a given encrypted data from, e.g., register/memory 122, one may use the key cryptographic function 120, input one 104, input two 110, and/or other inputs up to input K 112, and combine the inputs 104, 110, and/or 112, etc. and use the combined value 116 in the key cryptographic function 120, operating in decrypt mode, to obtain data 106 from the given encrypted data 122. Decryption may include use of one or more exclusive OR (XOR) functions to obtain the data 106 that originally was encrypted by the cryptographic device 108.

According to one exemplary embodiment, the cryptographic combiner or mix function 114 and/or key cryptographic function 120, may be created using an exemplary programmable logic device (PLD) such as, e.g., but not limited to, a programmable array logic (PAL) device, a complex programmable logic device (CPLD), a field programmable gate array (FPGA), an application specific integrated circuit (ASIC), a photonic processor, and/or an intellectual property core (IP core), etc., in various exemplary embodiments.

Programmable Logic Devices (PLDs) may include, among other devices:
1. Programmable Array Logic (PAL), these not used as much anymore;
2. Complex Programmable Logic Device (CPLD), functionally between a PAL and an FPGA;
3. Field programmable gate array (FPGA), a next step up from CPLD;
4. Application Specific Integrated Circuits (ASIC), lower cost/per part compared to FPGA when large volume needed (>10K units), also lower power than FPGA;
5. Photonics Processors, state-of-the-art optical switching devices; and/or
6. Intellectual Property Core (IP core), typically IP cores may be used as a logic block within, or as part of an ASIC and/or FPGA.

By varying the values of parameters of the LUT(s) and/or the inter-bank connection(s), one can realize numerous different exemplary embodiments of combining functions and/or devices. According to an exemplary embodiment the ability to alter values and/or parameters of the LUTs and/or the inter-bank wiring, offer tremendous flexibility in realizable combiners but depending on need, say for example cryptographic irreversibility, some choices may be better than others.

Figure 3:
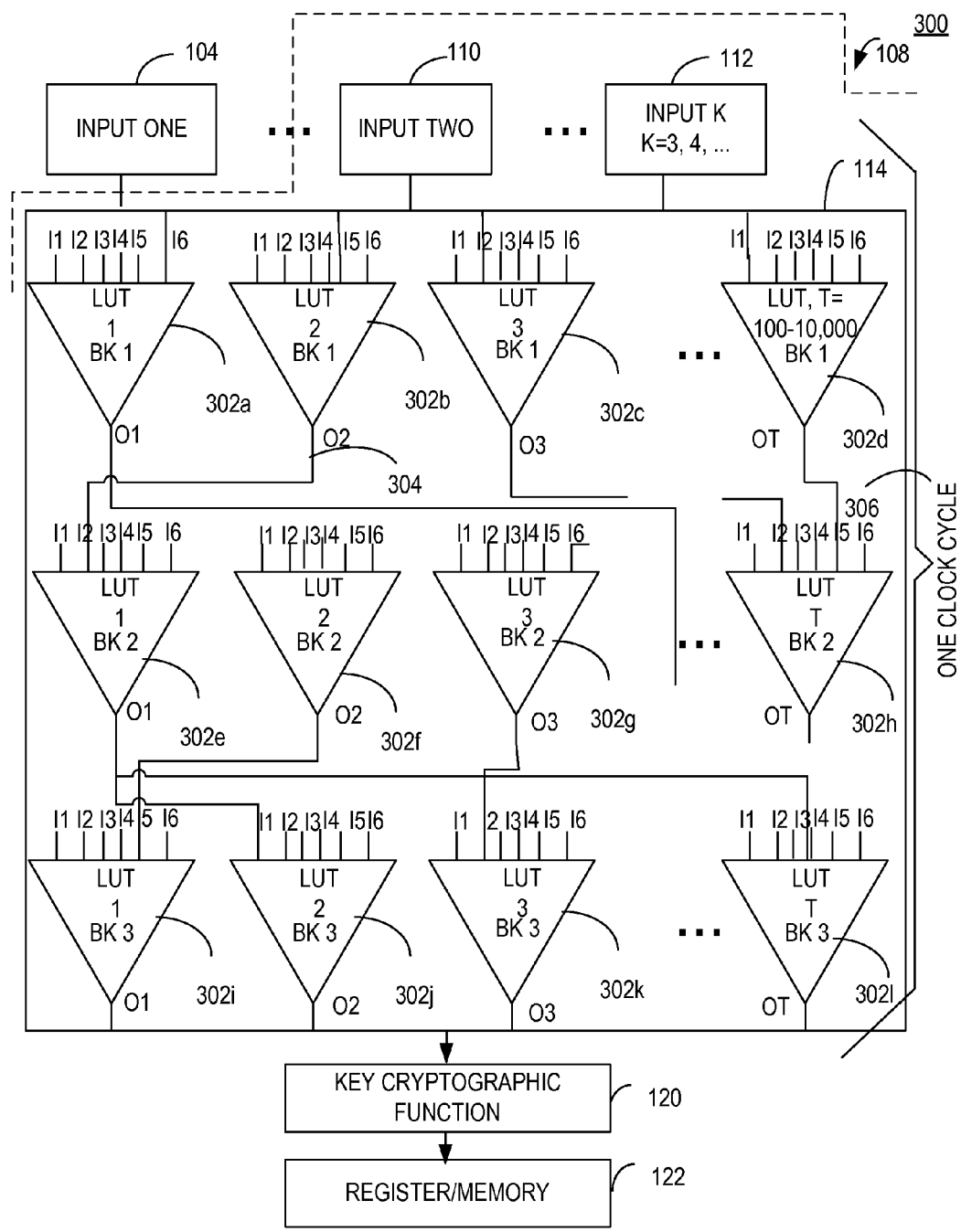
FIG. 3 depicts an exemplary embodiment of an exemplary cryptographic combiner or mix function, according to an exemplary embodiment.

FIG. 3 depicts diagram 300 illustrating an exemplary cryptographic combiner 114 of an exemplary cryptographic device 108 coupled to one and/or more inputs 104, 110, and/or up to 112, and providing one or more outputs O1, O2, O3, . . . , OT 304 to key cryptographic function 120 and/or register/memory 122, according to an exemplary embodiment. According to an exemplary embodiment, any of the LUTs 302a, 302b, 302c, 302d, 302e, 302f, 302g, 302h, 302i, 302j, 302k and 302l, (hereafter collectively referred to as 302) may include exemplary 6 input by 1 output LUTs 302, with up to an exemplary 100 s to 10,000 s of LUTs 302 per bank and an exemplary three (3) banks of LUTs 302, and as illustrated with an exemplary, but not limited to, same number T of LUTs 302 per bank, as compared to exemplary possible variable number of LUTs 202 per bank, as illustrated in FIG. 2, according to an exemplary embodiment. According to an exemplary embodiment, key cryptographic function 120 may also be implemented using the same programmable logic device as used to implement the cryptographic combiner 114. According to an exemplary embodiment, the cryptographic combiner and/or key cryptographic function 120 may perform its or their logical processing within an exemplary single clock cycle, according to an exemplary embodiment.

Overview of Various Exemplary Embodiments

An exemplary digital system may comprise an exemplary processor device which may execute one or more applications that may reside in off-processor non-volatile memory or storage or that may use off-processor volatile memory for storing application code and/or data. Such application code and/or data may have high intrinsic value and may require encryption before storage in the exemplary off-device volatile and/or non-volatile memory to prevent piracy, Intellectual Property (IP) theft and/or reverse engineering, according to an exemplary embodiment. Such encryption can be realized by an exemplary, but nonlimiting encryption algorithm, which may be implemented within, e.g., but not limited to, device fabric, etc. If the encrypted data has sufficiently high value, then the use of a fixed key for the encryption algorithm provides inadequate protection, as the fixed key is subject to discovery via side-channel and/or other cryptanalytic methods. The exemplary cryptographic combiner 114, according to an exemplary embodiment of the present invention may provide an additional line of defense and may enable one to address such side-channel or other cryptanalytic threats. An exemplary fixed secret value, such as an exemplary input 104 may be continuously modified, according to an exemplary embodiment, by combining with other exemplary input parameters such as other inputs 110, 112 producing an exemplary varying encryption key output 116 of the cryptographic combiner 114, according to exemplary embodiment of the present invention. An exemplary embodiment may present a fluid, changing, target to an attacker and may significantly increase the difficulty of applying existing, conventional cryptanalytic techniques to detect the exemplary secret value. According to the exemplary embodiment, illustrated in FIG. 2, mixing and/or combining the exemplary entire fixed secret with exemplary time varying quantities within a single clock cycle prevents the attacker from gaining useful information about pieces of the fixed secret, a necessary requirement of side-channel attacks. Since the exemplary data encryption key output 116, of the cryptographic combiner 114, according to an exemplary embodiment is continuously time varying, any side-channel attacks applied to the key cryptographic function encryption algorithm 120 to attempt to recover the encryption key 116, are stymied.

The exemplary cryptographic combiner 114, according to an exemplary embodiment of the present invention, is extremely flexible. Exemplary look-up-tables (LUTs) 202, according to an exemplary embodiment, are each individually programmable. Also, the inter-LUT wiring 204 may also be individually programmable at the designer's discretion. These two parameters, the LUTs 202, and inter-LUT wiring 204 enable many and varied functions to be realized, transforming the various exemplary inputs 104, 110, and/or 112, etc. into an exemplary output 116 of the exemplary cryptographic combiner 114, according to an exemplary embodiment. Certain exemplary embodiments of the cryptographic device 108, may be hard to cryptographically reverse, that is, e.g., but not limited to, if one were to see the exemplary output 116 of the cryptographic combiner function 114 and only certain of the inputs, such as, e.g., but not limited to, 112 and 110, then one could not easily determine the remaining input 104, for example, according to an exemplary embodiment of the invention. Additionally, in certain exemplary embodiments, one could not predict the output 116 of exemplary cryptographic combiner 114, without knowing all of the input values 104, 110, and up to 112. In an exemplary communication system, according to an exemplary embodiment, requiring an exemplary stream cipher one may require an exemplary secret pseudo-random bit stream to encrypt an exemplary incoming data stream via, e.g., but not limited to, an exemplary bit-wise exclusive-or (XOR) logic addition operation. This exemplary secret pseudo-random bit stream may be generated, according to an exemplary embodiment, by transforming an exemplary secret key repeatedly in some exemplary time-varying way that may be hard to reverse and such that the time-varying output is hard to predict. In an exemplary cryptographic combiner 114, according to an exemplary embodiment of the present invention, input 104 may be the exemplary secret key shared only between the sender and recipient of the exemplary encrypted data D 106. Input 110, according to an exemplary embodiment could be an exemplary counter or other publicly know time varying value, according to an exemplary embodiment. Output 116, according to an exemplary embodiment, may be the exemplary secret pseudo-random bit-stream used to XOR over the data D 106, in an exemplary embodiment.

By varying the values of parameters of the LUTs and/or the inter-bank connections, one can realize numerous different exemplary embodiments of cryptographic combining 114 functions and/or cryptographic devices 108. According to an exemplary embodiment the ability to alter values and/or parameters of the LUTs and/or the inter-bank wiring, offer tremendous flexibility in realizable combiners 114, but depending on need, say, for example, for cryptographic irreversibility, or other criterion, etc., some choices may be better than others.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical and/or electrical contact with each other. "Coupled" may mean that two or more elements are in direct physical or electrical contact. However, "coupled" may also mean that two or more elements are not in direct contact with each other, and/or are indirectly connected to one another, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the discussions herein, it is appreciated that throughout the specification discussions utilizing terms such as "processing," "computing," "calculating," "determining," or the like, refer to the action and/or processes of a system, or a processor, or a programmable logic device (PLD), or a computer or computing system, and/or similar electronic computing device, that manipulate and/or transform data represented as physical, such as electronic, quantities within the computing system's registers and/or memories into other data similarly represented as physical quantities within the system's memories, registers or other such information storage, transmission, input, output, or display devices.

In a similar manner, the term "processor" may refer to any device or portion of a device, or logic device, that processes electronic data, and/or data from registers and/or memory to transform that electronic data into other electronic data that may be stored in registers and/or memory. A "platform" may comprise one or more processors.

Embodiments of the present invention may include apparatuses or systems for performing the logical operations herein. An apparatus may be specially constructed for the desired purposes, or it may comprise a general purpose device selectively activated or reconfigured by a program stored in the device.

In one embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

While various embodiments of the present invention have been described above, it should be understood that they have been presented by way of example only, and not limitation. Thus, the breadth and scope of the present invention should not be limited by any of the above described exemplary embodiments, but should instead be defined only in accordance with the following claims and their equivalents.

What is claimed is:

1. A method comprising:
  receiving, by at least one cryptographic combiner device, at least one large bit length input value; and
  transforming, by said at least one cryptographic combiner device, said at least one large bit length input value into at least one output value,
  wherein said transforming comprises
    transforming, by said at least one cryptographic combiner device, said at least one large bit length input value into said at least one output value within a single clock cycle.

2. The method according to claim 1, wherein said at least one cryptographic combiner device comprises at least a portion of:
  at least one programmable logic device (PLD).

3. The method according to claim 2, wherein said at least one PLD comprises at least one of:
  at least one field programmable gate array (FPGA);
  at least one application specific integrated circuit (ASIC);
  at least one programmable logic array (PLA);

at least one programmable read only memory (PROM);
at least one erasable programmable read only memory (EPROM);
at least one electrically erasable programmable read only memory (EEPROM);
at least one programmable array logic (PAL);
at least one generic array logic (GAL);
at least one programmable electrically erasable logic (PEEL);
at least one semiconductor intellectual property core (IP core);
or
at least one complex programmable logic device (CPLD).

4. The method according to claim 1, wherein said transforming is performed on an entirety of said large bit length input value.

5. The method according to claim 1, wherein said cryptographic combiner device comprises:
at least one bank of at least one look-up-table (LUT), each said at least one LUT receiving as input a plurality of single bit input values, and providing as output at least one output bit,
wherein when said cryptographic combiner device comprises a plurality of banks of said at least one LUT, the at least one output bit from a first of said plurality of banks is wired to feed into the input of said at least one LUT of a second of said plurality of banks, and
wherein a total number of banks of said at least one LUTs is any number so long as said large bit length input reaches an output of the last bank of said plurality of banks, to produce said at least one output value, within a single clock cycle.

6. The method according to claim 5, wherein said performing comprises:
performing said transforming on said plurality of banks of said at least one look-up-table (LUT), wherein said at least one LUT comprises at least one of:
a small LUT;
a programmable LUT; or
an n-bit input to x-bit output LUT.

7. The method according to claim 6, wherein said at least one LUT comprises an n-bit input to x-bit output LUT, and wherein said n-bit input LUT comprises an at least six (6)-bit input LUT, and said x-bit output LUT comprises an at least one (1)-bit output LUT.

8. The method according to claim 6, wherein said at least one LUT comprises an n-bit input to x-bit output LUT, and, wherein said plurality of banks comprises a plurality m banks, where m is greater than 1, and wherein each of said m banks comprises a plurality Tj LUTs of said at least one LUT for each bank j=1, 2, . . . , m, wherein for each of said plurality m banks of said plurality Tj LUTs accepts a product Tj*n input bits and produces as output a product Tj*x output bits for each bank j=1, 2, . . . , m.

9. The method according to claim 8, wherein each of said m banks is adapted to operate in parallel and with sufficient efficiency comprising at least one of:
that computing said at least one output value,
processing to obtain said at least one output value, or
feeding through all said m banks to obtain said at least one output value within said single clock cycle.

10. The method according to claim 8, wherein said at least one LUT comprises said n-bit input to x-bit output LUT, wherein 1<=j<m, and wherein at least one output from a given bank j, is coupled to at least one of T(j+1)*n inputs to next bank j+1.

11. The method according to claim 10, wherein said coupling comprises programmably wiring said at least one output from said given bank j to feed to said at least one of said T(j+1)*n inputs of said next bank j+1.

12. The method according to claim 8, wherein said at least one LUT comprises said n-bit input to x-bit output LUT, and wherein signals propagate through all said m plurality banks within said single clock cycle.

13. The method according to claim 10, wherein said coupling comprises at least one inter-bank coupling.

14. The method according to claim 13, further comprising:
altering said at least one interbank coupling or at least one parameter of said at least one LUT to achieve a plurality of cryptographic functions.

15. The method according to claim 14, further comprising at least one of:
wherein said altering comprises programmably altering said at least one interbank coupling or said at least one parameter of said at least one LUT;
wherein said at least one interbank coupling comprises at least one changeable coupling;
wherein said altering comprises dynamically altering said at least one interbank coupling or said at least one parameter of said at least one LUT;
wherein said altering comprises altering dynamically during use; or
wherein said altering comprises altering dynamically over time, during use.

16. The method according to claim 1, wherein said transforming comprises:
combining at least one fixed secret value with at least one time varying input value comprising transforming said at least one fixed secret value into at least one second time varying secret value.

17. The method according to claim 16, wherein said transforming comprises:
using said at least one second time varying secret value in at least one subsequent cryptographic processing wherein a secret value is required.

18. The method according to claim 2, wherein said cryptographic combiner device comprises:
said portion of said at least one PLD, wherein said receiving said large bit length input value and said transforming said large bit length input value into said output value on said PLD comprises:
performing a full transformation on an entire input within said single PLD clock cycle by using at least one programmable LUT in fabric of said PLD.

19. The method according to claim 1, wherein said input value constitutes at least one fixed secret value and at least one time varying quantity so as to obscure said at least one fixed secret value and minimizing side channel information leakage about said at least one fixed secret.

20. The method according to claim 3, wherein said input value constitutes at least one secret and at least one time varying quantity, wherein when combined obscures said at least one secret, and minimizes side channel information leakage as could be used to detect said at least one secret.

21. The method according to claim 17, wherein said PLD comprises at least one of:
at least one application specific integrated circuit (ASIC);
at least one programmable logic array (PLA);
at least one programmable array logic (PAL);
at least one programmable read only memory (PROM);
at least one erasable programmable read only memory (EPROM);

at least one electrically erasable programmable read only memory (EEPROM);

at least one generic array logic (GAL);

at least one programmable electrically erasable logic (PEEL);

at least one semiconductor intellectual property core (IP core);

at least one intellectual property core (IP core);

at least one photonic processor; or at least one complex programmable logic device (CPLD).

22. The method according to claim 16, wherein said time varying secret value is used as a key for at least one of: an encryption function, or a keyed message authentication code (MAC) function.

23. The method according to claim 16, wherein said time varying secret value comprises the key to the advanced encryption standard (AES).

24. The method according to claim 16, wherein said time varying secret value is used as a pseudo-random bit stream for a cryptographic application.

25. The method according to claim 24, wherein said time varying secret value is used as said pseudo-random bit stream for said cryptographic application, to perform an XOR operation over an input data stream as a stream cipher.

26. A system comprising:
a cryptographic device comprising:
at least one cryptographic combiner adapted to receive at least one large bit length input value; and
wherein said at least one cryptographic combiner is adapted to transform the at least one large bit length input value into at least one output value, and
wherein said at least one cryptographic combiner is adapted to transform the at least one large bit length input value into said at least one output value within a single clock cycle.

27. The system according to claim 26, wherein said cryptographic device further comprises:
at least one key cryptographic function comprising at least one input coupled to at least one output of said at least one cryptographic combiner.

28. The system according to claim 27, wherein said at least one key cryptographic function comprises an advanced encryption standard (AES) key cryptographic function.

29. The system according to claim 26, wherein the at least one large bit length input value comprises at least one output of at least one processor.

30. The system according to claim 26, wherein said at least one cryptographic combiner comprises at least a portion of:
at least one programmable logic device (PLD).

31. The system according to claim 30, wherein said at least one PLD comprises at least one of:
at least one field programmable gate array (FPGA);
at least one application specific integrated circuit (ASIC);
at least one programmable logic array (PLA);
at least one programmable read only memory (PROM);
at least one erasable programmable read only memory (EPROM);
at least one electrically erasable programmable read only memory (EEPROM);
at least one programmable array logic (PAL);
at least one generic array logic (GAL);
at least one programmable electrically erasable logic (PEEL);
at least one semiconductor intellectual property core (IP core); or
at least one complex programmable logic device (CPLD).

* * * * *